US006266456B1

United States Patent
Lee et al.

(10) Patent No.: US 6,266,456 B1
(45) Date of Patent: Jul. 24, 2001

(54) OPTICAL FIBER POLARIZATION SCRAMBLER AND OPERATING PARAMETER INPUT METHOD THEREFOR

(75) Inventors: Bong Wan Lee; Yeon Wan Koh; Young Bae Yeo; Byoung Yoon Kim, all of Taejon (KR)

(73) Assignee: Donam Systems Inc. (KR)

(*) Notice: Subject to any disclaimer, the term of this patent is extended or adjusted under 35 U.S.C. 154(b) by 0 days.

(21) Appl. No.: 09/403,379

(22) PCT Filed: Jul. 14, 1998

(86) PCT No.: PCT/KR98/00208

§ 371 Date: Oct. 19, 1999

§ 102(e) Date: Oct. 19, 1999

(87) PCT Pub. No.: WO99/42891

PCT Pub. Date: Aug. 26, 1999

(30) Foreign Application Priority Data

Feb. 21, 1998 (KR) .................................................... 98-5470

(51) Int. Cl.[7] .................................................... G02B 6/00
(52) U.S. Cl. .............................................. 385/11; 359/497
(58) Field of Search ........................ 385/1–3, 11; 359/156, 359/161, 483–485, 489, 494, 497, 499

(56) References Cited

U.S. PATENT DOCUMENTS 4,923,290  5/1990  Brinkmeyer et al. ................ 350/377
5,159,481 * 10/1992  Maeda ................................... 359/189
5,633,959 *  5/1997  Niki et al. .............................. 385/11

FOREIGN PATENT DOCUMENTS

| 293 206 A5 | 8/1991 | (DE) . |
| 42 23 740 A1 | 1/1994 | (DE) . |
| 2 234 828 | 2/1991 | (GB) . |
| 60-7418 * | 1/1985 | (JP) . |
| 62-148921 * | 7/1987 | (JP) . |
| 4-364420 * | 12/1992 | (JP) . |
| 6-147905 * | 5/1994 | (JP) . |

* cited by examiner

Primary Examiner—Phan T. H. Palmer
Assistant Examiner—Michelle R. Connelly-Cushwa
(74) Attorney, Agent, or Firm—Marger Johnson & McCollom, P.C.

(57) ABSTRACT

An optical fiber polarization scrambler decreasing the degree of polarization (DOP) of light efficiently using at least two optical fiber birefringence modulators (10, 11) and an operating parameter input method for the same. Birefringence modulators are constructed with hollow cylindrical piezo devices (10, 11) and a strand of optical fiber (30) wound continuously on the outer walls of the piezo devices (10, 11). An angle between the birefringence modulators consisting of the optical fiber polarization scrambler is configured to compensate the effect of circular birefringence. A method for exactly configuring birefringence modulation frequency and birefringence modulation amplitude to achieve effective polarization scrambling for the optical fiber polarization scrambler is also provided.

16 Claims, 9 Drawing Sheets

OPTICAL FIBER POLARIZATION SCRAMBLER AND OPERATING PARAMETER INPUT METHOD THEREFOR

TECHNICAL FIELD

The present invention relates to a polarization scrambler, more specifically to an optical fiber polarization scrambler which effectively decreases degree of polarization of the output light using at least two optical fiber birefringence modulators.

The present invention also relates to an operating parameter input method of an optical fiber polarization scrambler, more specifically to a method for inputting a predetermined values of parameters such as a modulation frequencies and modulation amplitudes established by experiments to effectively operate the optical fiber polarization scrambler.

BACKGROUND ART

Polarization scramblers are devices that converts highly polarized light into light with a scrambled polarization by modulating the state of polarization("SOP"). Degree of polarization("DOP") represents the ratio of polarized light to total light. For example, the DOP of perfectly polarized light is 100%, whereas the DOP of completely depolarized light is 0%. The function of the polarization scrambler is to decrease the DOP in time average. An ideal polarization scrambler forces input light of 100% DOP to output light of 0% DOP.

When light goes through an optical component having a polarization-dependent loss, output power depends on the input SOP of the light. In this case, constant time-averaged output power can be obtained regardless of the input SOP by inserting a polarization scrambler in front of the optical component. Enhanced signal-to-noise ratio can also be obtained with the polarization scrambler in a fiber-optic sensor, optical measurement system and long-haul optical transmission system.

The output SOP is evolved by a birefringence medium, especially the amount of the birefringence and the angle of the birefringence axis when polarized input light is propagating along the optical fiber. For the light which has been transmitted along a long optical fiber over a few meters, however, the output SOP is apt to change since the birefringence of the fiber is easily affected by small environmental perturbation such as temperature and pressure. This leads to output power fluctuation of the light which went through an optical device having certain polarization-dependent loss. However, the fluctuation of the output light could be prevented if it is averaged in time by decreasing the DOP of the output light through polarization modulation.

If the polarization direction of the input light coincides with the direction of the birefringence axis of the birefringence modulator, the output SOP will not vary even with any change of the birefringence. Therefore, in order to induce polarization modulation of the output light regardless of the input SOP using birefringence amplitude modulation, at least two polarization modulators whose birefringence axes form an angle of 45° must be used.

In the prior art, a polarization scrambler is implemented by inducing birefringence modulation in an integrated optical circuit, such as a lithium niobate ($LiNbO_3$) optical waveguide. However, this kind of the polarization scrambler has the disadvantages of low efficiency, difficulty in connecting two or more birefringence modulators, and high insertion loss.

U.S. Pat. No. 4,923,290 discloses a basic concept of the polarization scrambler using an optical fiber. However, since the method of directly exerting pressure onto the optical fiber is used to implement the scrambler, the device for inducing the birefringence has a low efficiency with scrambling frequency lower than few hundred Hz, which is too low. Also the birefringence axis is subject to easy change and the output SOP deteriorates. This renders the realization of the polarization scrambler with good performance difficult.

DISCLOSURE OF THE INVENTION

An object of the present invention is to provide an optical fiber polarization scrambler which can efficiently carry out polarization modulation and make the time-averaged DOP zero regardless of the input SOP and an operating parameter input method therefor.

Another object of the present invention is to provide an optical fiber polarization scrambler with very low insertion loss and stable performance regardless of the input SOP using enhanced optical fiber birefringence modulators whose modulation frequencies are in orders of hundred kHz to MHz and an operating parameter input method therefor.

A further object of the present invention is to provide an optical fiber polarization scrambler comprising a strand of optical fiber whose structure can counterbalance the effect of the circular birefringence caused by twisting the optical fiber between the neighboring birefringence modulators, while providing the most efficient operating parameter input method therefor.

In order to achieve the above-mentioned objects, the optical fiber polarization scrambler according to the present invention comprises optical fiber birefringence modulators and alternating voltage sources. The optical fiber birefringence modulators include at least two hollow cylindrical piezo devices and a continuous optical fiber wound around outer walls of the piezo devices. The alternating voltage sources respectively apply alternating voltage to each optical fiber birefringence modulator to induce birefringence modulation. The continuous optical fiber is wound around the piezo devices without any twisting in axial direction of the optical fiber to prevent inducing of circular birefringence thereat. But the section of the optical fiber linking the neighboring birefringence modulators is twisted so that the input light passed the front birefringence modulator with its polarization plane being parallel to a principal axis of the front birefringence modulator can be launched into the back birefringence modulator with its polarization plane forming an angle of 45±90n degrees with respect to a principal axis of the back birefringence modulator, where n is an integer.

According to the present invention, the hollow cylindrical piezo devices can have different wall thickness to make the resonance frequency of the thickness mode of each piezo device of the optical fiber birefringence modulators different.

Also, it is preferable that the means for compensating effect of circular birefringence caused by twisting applies further twist to the section of the optical fiber linking neighboring birefringence modulators. Additional twist is of the angle corresponding to 8% of (45±90n) degrees and the total angle between the principal axes of the neighboring birefringence modulators becomes 1.08×(45±90n) degrees which also means the total twist of the linking optical fiber, where n is an integer.

Preferably, the optical fiber is a single-mode optical fiber whose intrinsic birefringence is $5\times10^{-6}$ or less.

Also, preferably, the linear birefringence induced by tension winding and bending of the optical fiber on the outer wall of the piezo device is maintained 30 times or more than the intrinsic birefringence of the optical fiber, and more preferably the wound optical fiber is annealed to eliminate spurious birefringence.

In addition, the cross-section of the optical fiber is in a shape of D, and the optical fiber can be wound with the flat plane of the optical fiber abutting the outer walls of the piezo devices to prevent twist of the optical fiber in the axial direction.

On the other hand, the optical fiber polarization scrambler according to the present invention can further comprise means for measuring temperature of the birefringence modulator; and means for determining modulation amplitude corresponding to the temperature sensed by the means for measuring the temperature.

In another structure of optical fiber polarization scrambler according to the present invention, the optical fiber polarization scrambler comprises: optical fiber birefringence modulators including at least two hollow cylindrical piezo devices and an optical fiber wound around outer walls of the hollow cylindrical piezo devices; and alternating voltage sources applying alternating voltage to each optical fiber birefringence modulator to induce birefringence modulation, wherein the polarization controller is inserted between the neighboring birefringence modulators.

Also in this structure, the hollow cylindrical piezo devices can have different wall thickness to make the resonance frequency of the thickness mode of each piezo device of the optical fiber birefringence modulators different.

Preferably, the polarization controller is an all-fiber polarization controller.

In addition, this structure can further comprise means for measuring temperature of the birefringence modulator; means for determining modulation amplitude corresponding to the temperature sensed by the means for measuring the temperature; and means for maintaining temperature of the birefringence modulator constant.

The operating parameter input method for an optical fiber polarization scrambler, according to the present invention, comprising optical fiber birefringence modulators including at least two hollow cylindrical piezo devices and a continuous optical fiber wound around each outer wall of the piezo devices without twist in axial direction of the optical fiber to prevent inducing of circular birefringence; and alternating voltage sources for applying alternating voltage to each optical fiber modulator to induce birefringence modulation is as follows.

The alternating voltages applied to birefringence modulators have sinusoidal waveforms whose frequency difference is larger than the required bandwidth, the amplitude of the alternating voltage being configured as a value minimizing the DOP measured from output light signal sensed by an optical sensor after light from the light source passing in turn an input polarization controller, the optical fiber polarization scrambler, an output polarization controller and a polarizer.

Preferably, the resonance frequency corresponding to the thickness mode of the piezo device is used as the birefringence modulation frequency.

On the other hand, the birefringence modulation amplitude of each optical fiber birefringence modulator can be selected from solutions of the zeroth-order Bessel function to operate the optical fiber polarization scrambler.

BRIEF DESCRIPTION OF THE DRAWINGS

The objects and advantages of the present invention will be more clearly understood to those skilled in the art with reference to the accompanying drawings in which.

BEST MODE FOR CARRYING OUT THE INVENTION

The present invention will now be described in detail referring to the accompanying drawings. However, the embodiments hereinafter described should be interpreted as illustrative and in no sense limiting.

Figure 1:
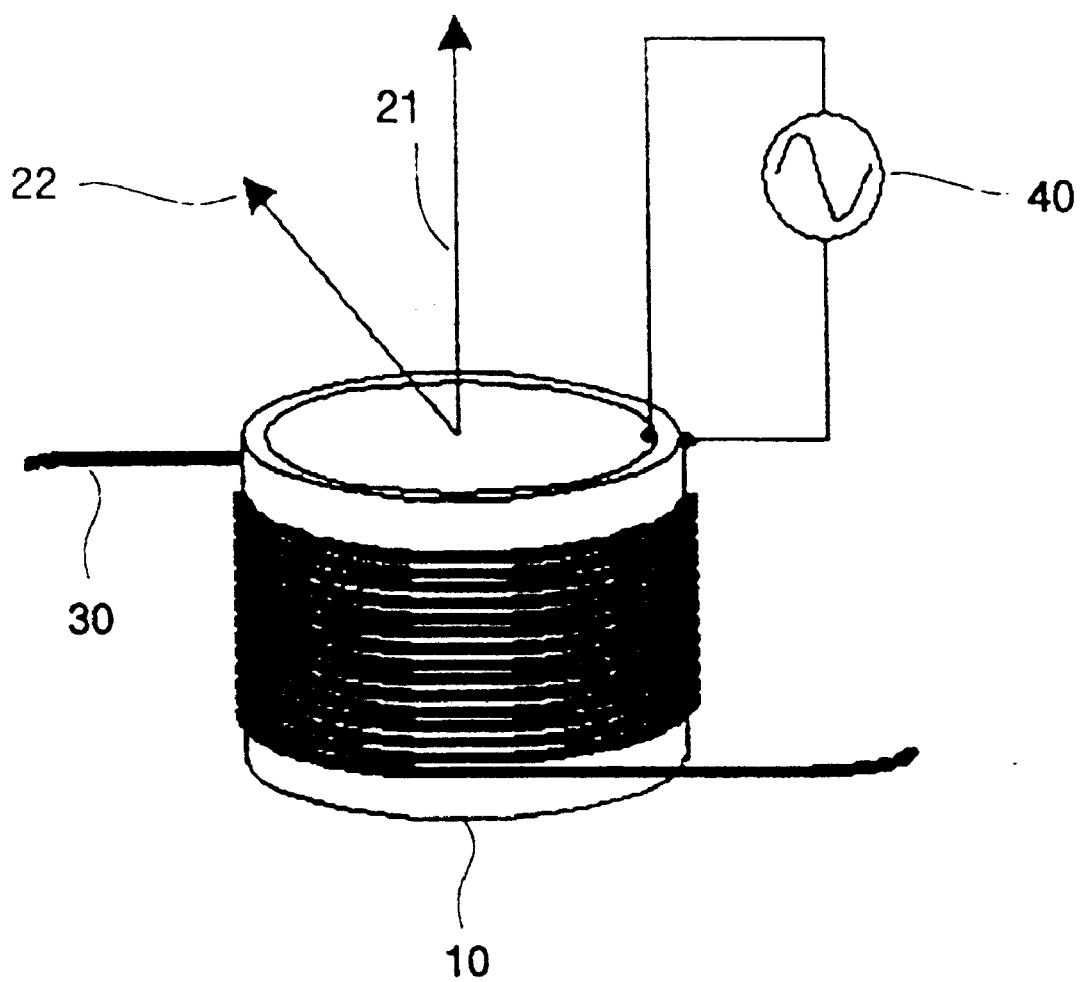
FIG. 1 shows a basic structure of the optical fiber birefringence modulator which is the gist device in constructing a polarization scrambler according to the present invention.

FIG. 1 shows a basic structure of the optical fiber birefringence modulator which is the gist device in constructing a polarization scrambler according to the present invention. Referring to FIG. 1, a single mode optical fiber 30 is wound around an outer wall of a cylindrical piezo device 10 such as a piezoelectric transducer("PZT") without any twist in axial direction of the optical fiber 30 to prevent inducing of circular birefringence. In order to prevent the twist, an optical fiber 30 can have a cross-section in a shape of "D" with the optical fiber 30 wound around the outer wall of the piezo device 10 with the flat plane abutting the outer wall of the piezo device 10. When a certain voltage signal of sinusoidal waveform is applied to the piezo device 30 by an alternating voltage source 40, not only the phase modulation is induced, but also the birefringence modulation is induced for the light passing through the optical fiber 30. Direction parallel to the axis of the cylinder 21 and direction normal to this, that is direction 22 normal to the cylindrical surface, become birefringence axes, where the amplitude of the birefringence modulation is denoted as the following equation (1).

$$\phi_m = V_m \alpha \sin(\omega_m t) \tag{1}$$

where $V_m$ and $\omega_m$ each corresponds to the amplitude and the angular frequency of the voltage signal applied to the piezo device, and $\alpha$ denotes the birefringence modulation coefficient. The coefficient depends not only upon jacket material and the length of optical fiber, but also on the frequency of the applied voltage signal.

The above device has been used only as a phase modulator because the birefringence modulation is extremely low to be used at the range of frequency less than 100 kHz. However, the method according to the present invention carries out the birefringence modulation in the proximity of the resonance frequency corresponding to the wall thickness of the cylindrical piezo device to enhance the efficiency for the applied voltage of the birefringence modulator. The resonance frequency depends on the raw material and wall thickness of piezo device, but generally it is denoted as the following equation (2).

$$f \cdot T = 200 \ [kHz \cdot cm] \quad (2)$$

Therefore, when using a hollow cylindrical piezo device whose wall thickness T is about 1 mm to 5 mm, a resonance frequency f of 400 kHz to 2 MHz can be used as the birefringence modulation frequency.

On the other hand, input light has to be linearly polarized, and the polarization plane must be adjusted to 45° with respect to the birefringence axes 21 and 22 for the birefringence modulator of FIG. 1 to operate as a polarization scrambler. For linearly polarized input light with polarization plane tilted 45 degrees with respect to the birefringence axis of the birefringence modulator modulating as in equation (1), the following equation (3) has to be satisfied for an output light to have a DOP of 0 when averaged in time sufficiently longer than the modulation period.

$$J_0(V_m \alpha) = 0 \quad (3)$$

Hear, the $J_0$ denotes the zeroth-order Bessel function of the first kind. Therefore, the birefringence modulation amplitude $V_m \alpha$ has to be a solution of the zeroth-order Bessel function, such as 2.405, 5.520, . . . That is, a frequency with large birefringence modulation coefficient is set as the frequency of the voltage signal and the modulation amplitude is set so that the $V_m \alpha$ is a value such as 2.405, 5.520 or the like.

On the other hand, when a single mode optical fiber is wound around the piezo device, it is important to prevent the optical fiber from twisting so that only linear birefringence should be induced in the optical fiber. To achieve this, in the present invention, a spun optical fiber is used as the single mode optical fiber which has very low intrinsic birefringence. Furthermore, the optical fiber is tension-wound and annealed at the temperature of about 100° C. so that the linear birefringence axis is parallel to the axis of the piezo device.

The tension-winding was carried out under the condition where the linear birefringence induced by the bending of the optical fiber caused by the radius of curvature of the piezo device and[ ]the tension in the optical fiber when winding around the piezo device is maintained 30 times or more than the intrinsic birefringence of the optical fiber.

Figure 2:
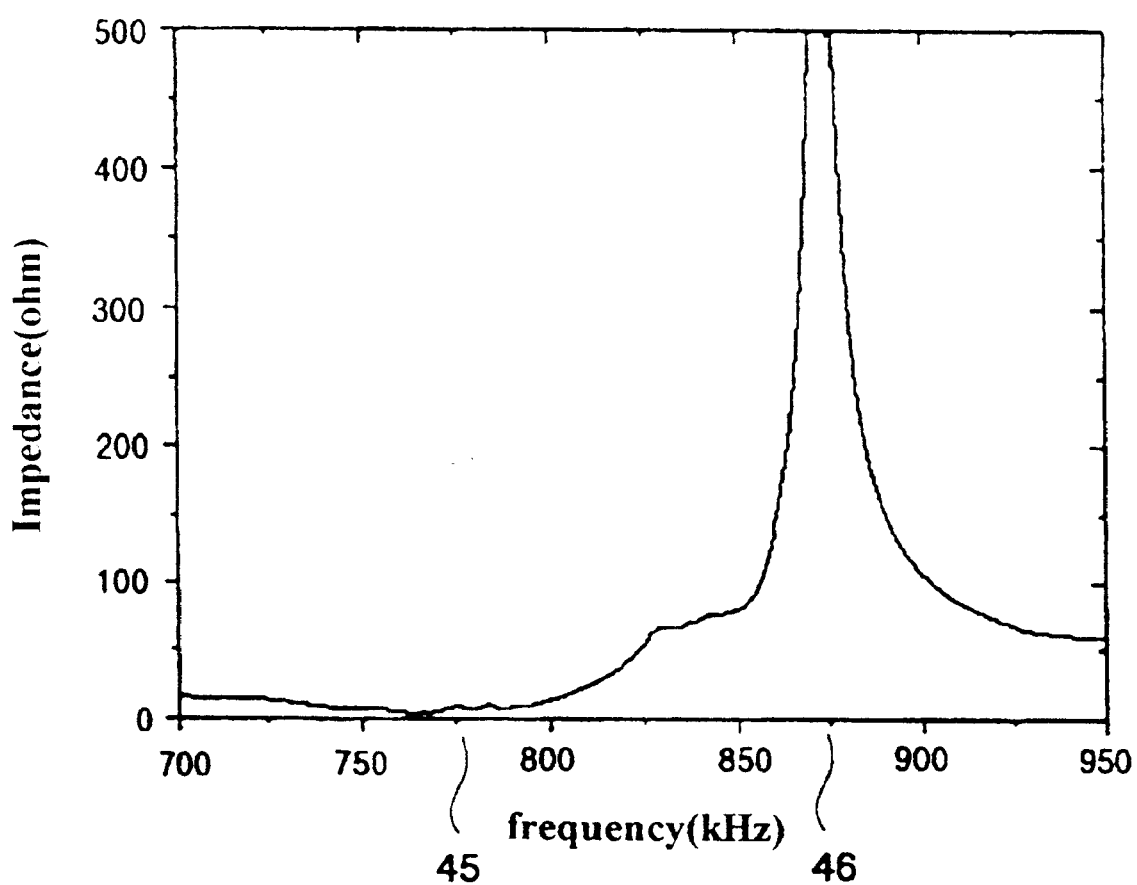
FIG. 2 is a graph showing the measured result of impedance as a function of the frequency for a hollow cylindrical piezo device used in an embodiment of the present invention.

FIG .2 is a graph showing the measured result of the impedance as a function of the frequency for the hollow cylindrical piezo device(diameter: 1.8", thickness: 0.1", length: 0.9") used in the embodiment according to the present invention. Referring to FIG. 2, it can be seen that the impedance is lowest in the proximity of the resonance frequency 45 of about 770 MHz, and that the impedance has local maximum in the proximity of the anti-resonance frequency 46 of about 875 kHz.

A single stage polarization scrambler was constructed with the piezo device having the impedance characteristics of FIG. 2 and the spun optical fiber was wound about 40 turns around the piezo device with the tension of 30 kpsi.

Figure 3:
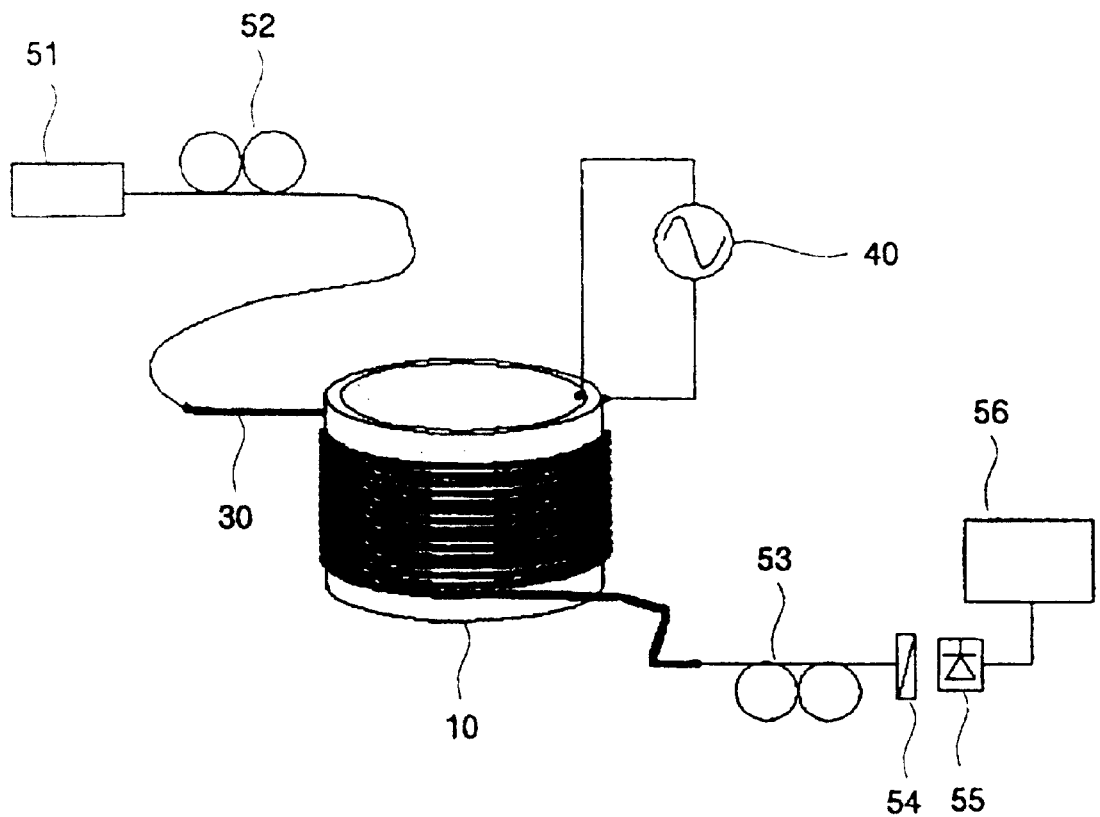
FIG. 3 shows the structure of the device for analyzing the characteristics of a single stage polarization scrambler.

FIG. 3 shows the experimental setup for analyzing the characteristics of the single stage polarization scrambler. A light source 51 is a laser diode emitting polarized light at the wavelength of 1.55 μm. An input polarization controller 52 is for controlling the polarization state of the input light to produce linearly polarized light. If linearly polarized input light parallel or perpendicular to the principal axis of the birefringence modulator is entered, there will be no effect of the polarization modulation. In order to maximize the effect of the polarization modulation, linearly polarized light whose polarization plane is aligned to form an angle of 45 degrees with respect to the principal axis should be entered into the birefringence modulator. The DOP of the output light is calculated by using an oscilloscope 56 after converting the light passing the output polarization controller 53 and the polarizer 54 into electric signals and then measuring the DC component of it. Here, the DOP is the ratio of the maximum change to the average in the amplitude of the DC component while varying the output polarization controller 53. Therefore, an optimum voltage amplitude can be determined by adjusting the amplitude of the sinusoidal voltage applied to the birefringence modulator so that the DOP of output light is minimized. Using this method, the optimum operating parameter of the optical fiber polarization scrambler can be obtained.

Figure 4:
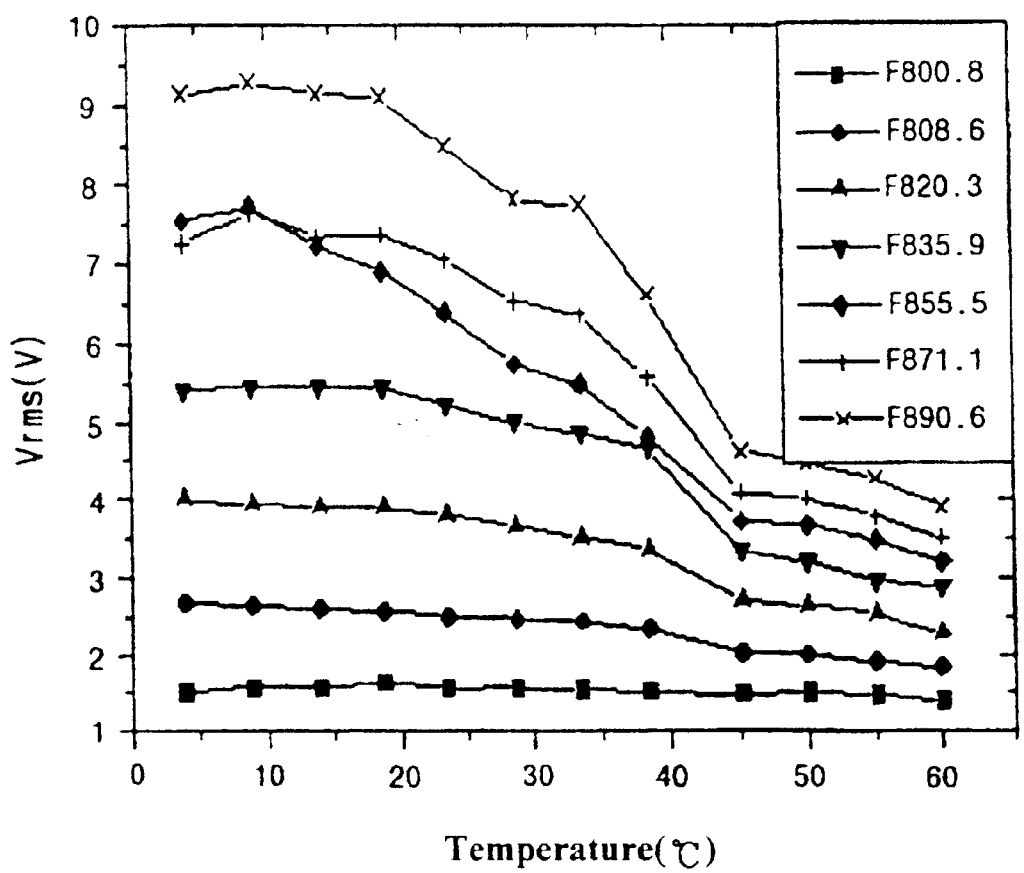
FIG. 4 is a graph showing the temperature dependency of the required voltage according to the operating frequency of the single stage polarization scrambler.

Next, FIG. 4 shows the temperature dependency of the required sinusoidal voltage amplitude for a few frequencies of 800.8, 808.6, 835.9, 855.5, 871.1 and 890.6 kHz which are in the proximity of the resonance frequency (about 770 kHz) and the anti-resonance frequency (about 875 kHz). Referring to FIG. 4, it can be seen that the amplitude of the voltage signal became lower when approaching the resonance frequency whereas increased when approaching the anti-resonance frequency. It should be noted that the amount of the birefringence modulation is too small outside the frequency of this range to be useful. Also, it could be seen that the amplitude of the voltage signal should be decreased when the environmental temperature of the birefringence modulator is raised. Furthermore, it should be pointed out that temperature stability is enhanced at the resonance frequency.

Therefore, from the result shown in FIG. 4, when inputting operating parameter of the optical fiber polarization scrambler, it could be seen that using the thickness mode resonance frequency of the piezo device as the birefringence modulation frequency is preferable.

Figure 5:
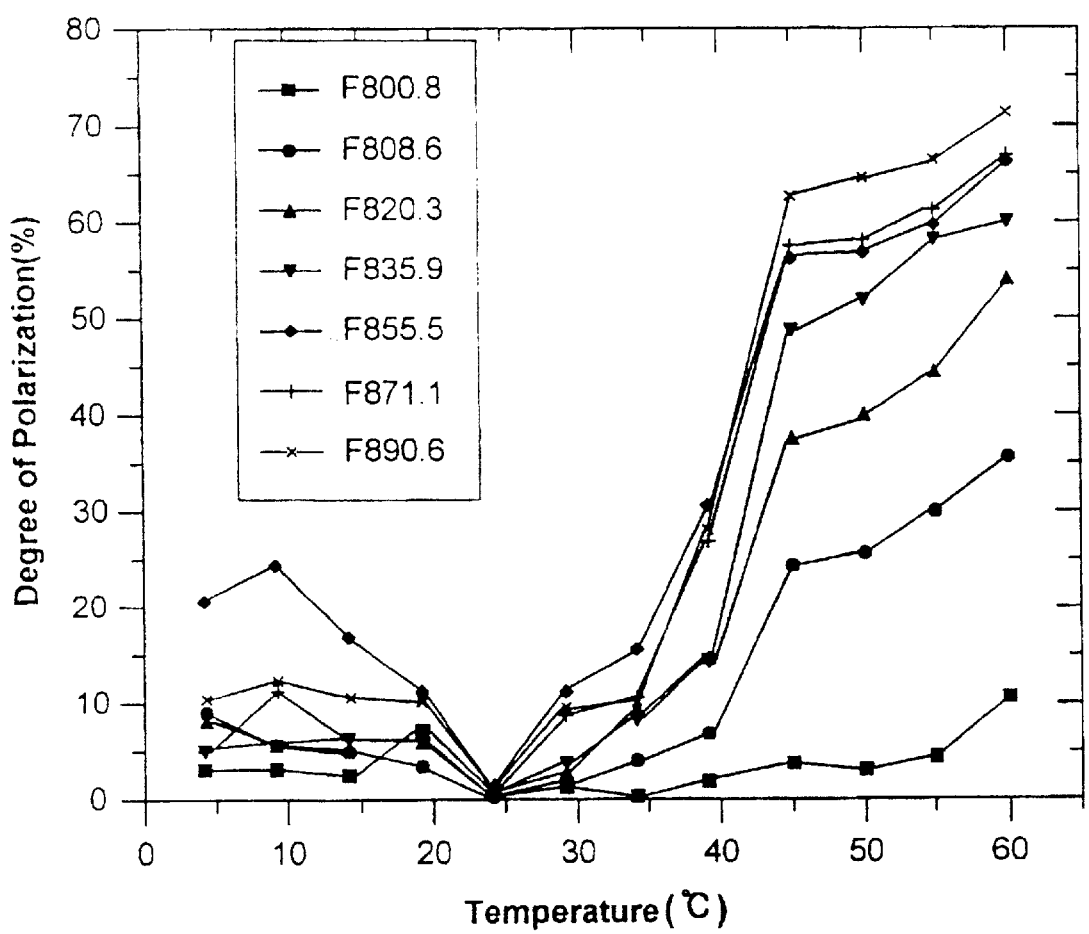
FIG. 5 is a graph showing a change in degree of polarization as a function of the temperature for the single stage polarization scrambler.

FIG. 5 is a graph showing the change in the degree of polarization against changes in the temperature of the polarization scrambler. In order to obtain the result of FIG. 5, the degree of polarization is measured while changing the temperature of the birefringence modulator after adjusting the amplitude of the voltage signal at each frequency to minimize the degree of polarization under the room temperature. As can be seen in FIG. 4, when applied voltage is constant, the degree of polarization increases since the amount of birefringence modulation is larger than 2.405 as the temperature rises. In order to maintain the degree of polarization within 10% at the temperature ranging from 0 to 60° C., the amplitude of the applied voltage signal has to be compensated for the temperature. By approximating linearly and compensating for the temperature, a low degree of polarization was to be maintained for a wide range of temperature.

On the other hand, when the compensation for the temperature is not carried out, operation at the resonance frequency will maintain a lower degree of polarization for a wider range of temperature compared with when operated at the anti-resonance frequency. The temperature compensation can be realized through temperature measuring means for measuring the temperature of the birefringence modulator and means for determining the modulation amplitude corresponding to the temperature sensed by the temperature measuring means.

The degradation of the DOP caused by temperature change can be prevented by using temperature maintaining means which maintains the temperature of the birefringence modulator constant.

Figure 6:
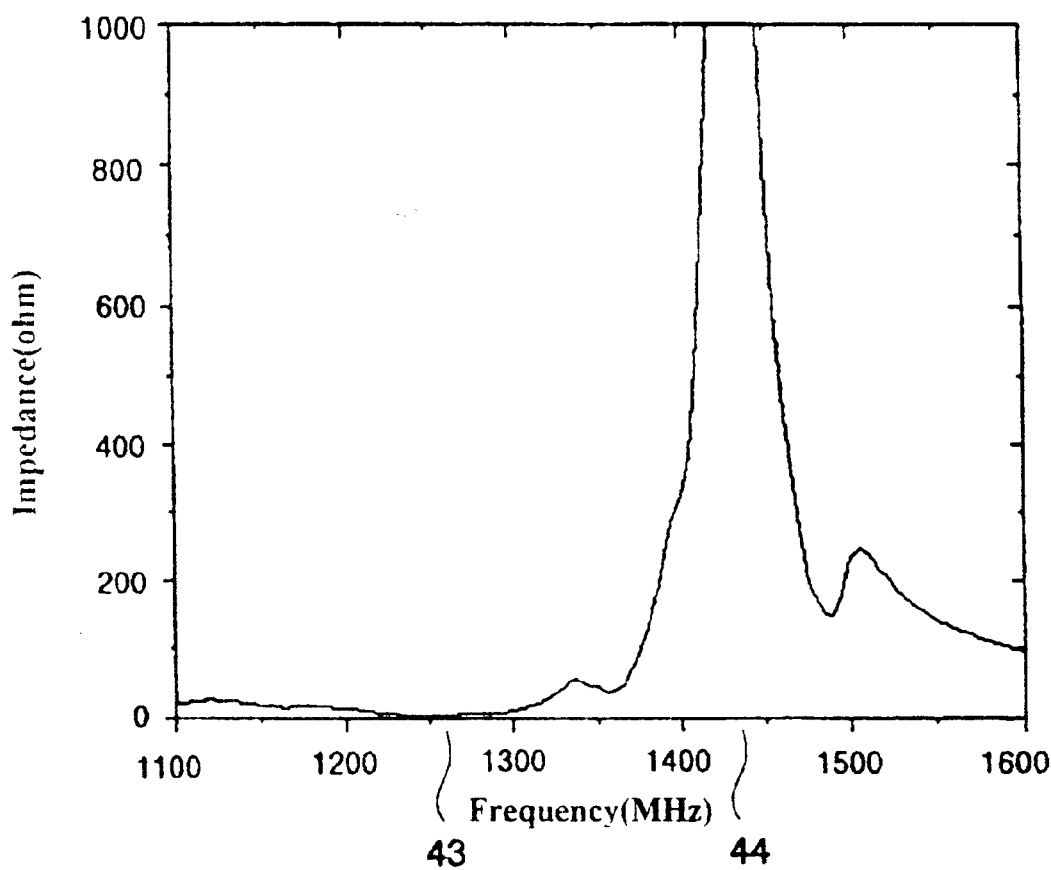
FIG. 6 is a graph showing the measured impedance in the proximity of resonance frequency corresponding to thickness mode of the hollow cylindrical piezo device of a different size.

FIG. 6 shows a measured result of the impedance in the proximity of the resonance frequency of the thickness mode of the hollow cylindrical piezo device(diameter: 1", thickness: 0.06", length 0.5") of a different size.

Figure 7:
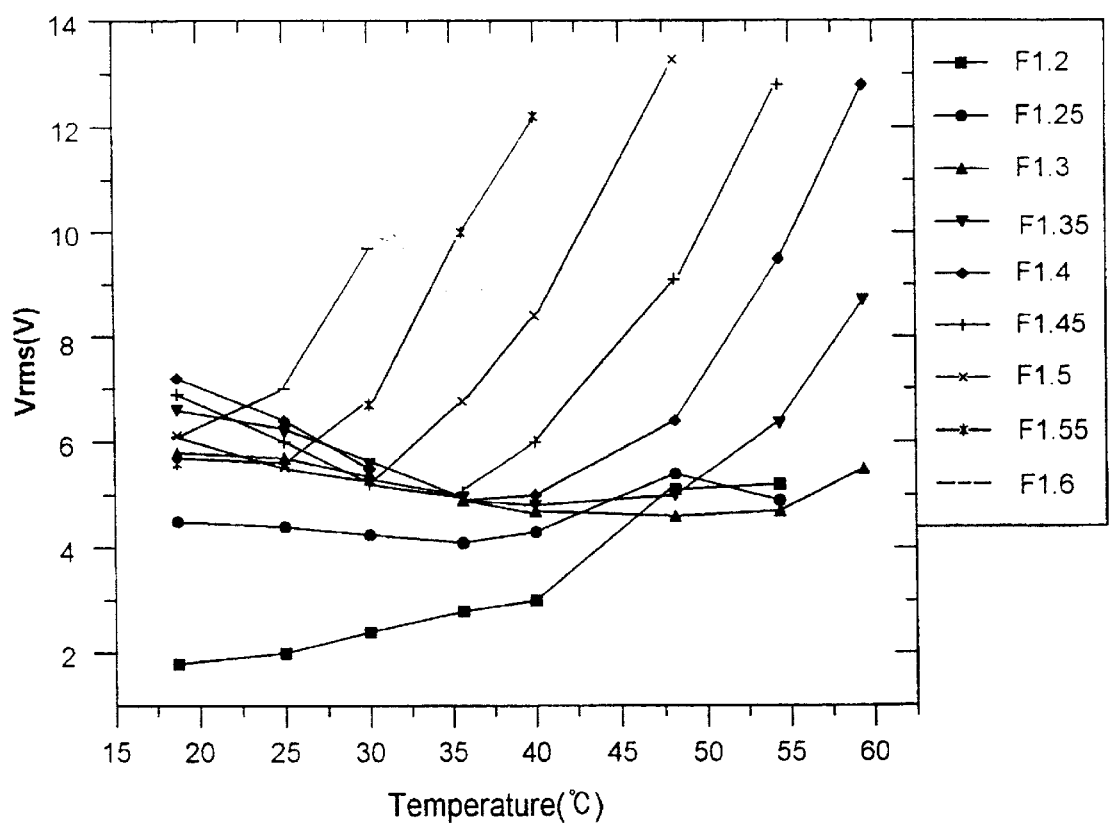
FIG. 7 is a graph showing the measured result of voltage needed to operate the polarization scrambler for a few frequencies between the resonance frequency and accompanying anti-resonance frequency as a function of the temperature.

FIG. 7 is a measured result of the required voltage to operate the polarization scrambler for several frequencies of 1.2, 1.25, 1.3, 1.35, 1.4, 1.45, 1.5, 1.55 and 1.6 MHz against the temperature. As can be seen here too, the amplitude change of birefringence modulation caused by the temperature can be prevented when the polarization scrambler is operated at a resonance frequency of 1.25 MHz. The resonance frequency is determined by the wall thickness of the cylindrical piezo device. Using this characteristics, polarization scrambler stable against the change of the temperature even without temperature compensation and having high electric efficiency can be manufactured.

On the other hand, since the performance of the single stage polarization scrambler varies extremely depending on the input SOP, two or more birefringence modulators are needed to manufacture a polarization scrambler which is not affected by the change of the input SOP. The birefringence axes of each birefringence modulator must form an angle of 45 degrees. That is, since a first birefringence modulator does not produce polarization modulation for the input light whose polarization plane is parallel to the birefringence axis of the first birefringence modulator, the effect of polarization scrambling is achieved after passing through a second birefringence modulator whose birefringence axis forms an angle of 45 degrees with respect to the linearly polarized light.

In order to maintain the degree of polarization to zero regardless of the input SOP when birefringence modulation is carried out by the sinusoidal voltage signal, the amplitude of each birefringence modulation must satisfy the following equation 4.

$$J_0(V_{m1}\alpha_1)=J_0(V_{m2}\alpha_2)=0 \tag{4}$$

Hear, $J_0$ is the zeroth-order Bessel function, and birefringence modulation amplitudes $V_{m1}\alpha_1$ and $V_{m2}\alpha_2$ must be solutions of the zeroth-order Bessel function such as 2.405, 5.520, . . .

While the frequencies of the voltage signals are selected from the resonance frequency corresponding to the thickness mode, the difference of the two frequencies should be large enough but sufficiently smaller than a required bandwidth and the amplitude $V_m\alpha$ should have such values as 2.405, 5.520, . . . For instance, if the polarization scrambler is used for suppressing so called polarization-dependent gain of an erbium-doped fiber amplifier, the frequency difference should be larger than a few tens of IcHz because the gain recovery rate corresponding to the erbium-doped fiber amplifier is of a few kHz.

Figure 8:
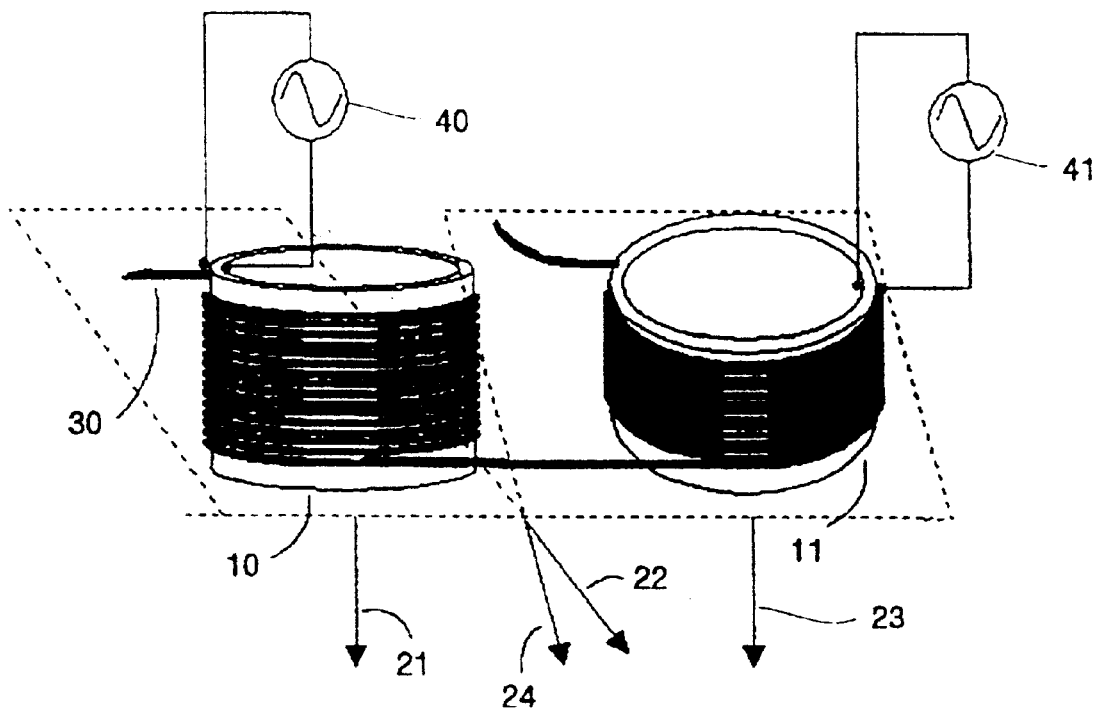
FIG. 8 shows a basic structure of a double stage polarization scrambler consisting of two birefringence modulators.

FIG. 8 shows a basic structure of the double stage polarization scrambler consisting of two birefringence modulators. The optical fiber connecting the two birefringence modulators is continuous and the angle therebetween is adjusted by twisting the optical fiber. On the other hand, when the optical fiber is twisted, circular birefringence is induced in the optical fiber and the polarization plane is rotated about 8% of the twist angle between 22 and 24. Of course, there must be no twisting of the optical fiber in axial-direction of the optical fiber at the optical fiber wound at each birefringence modulator.

Therefore, in an optical fiber polarization scrambler whose optical fiber is continuously wound (on neighboring hollow cylindrical piezo devices, the twist between the two birefringence modulators must be carried out with the angle for the compensation of the effect of rotation of the polarization plane caused by circular birefringence, in order to input at 45 degrees with respect to the principal axis of the second birefringence modulator when the polarization plane of the input light is parallel to the principal axis of the first birefringence modulator.

That is, in order to input the polarization plane parallel to the birefringence axis of the first birefringence modulator at 45 degrees with respect to that of the second birefringence modulator, the two birefringence modulators should form an angle of approximately 49 degrees (45+45×0.08).

Figure 9:
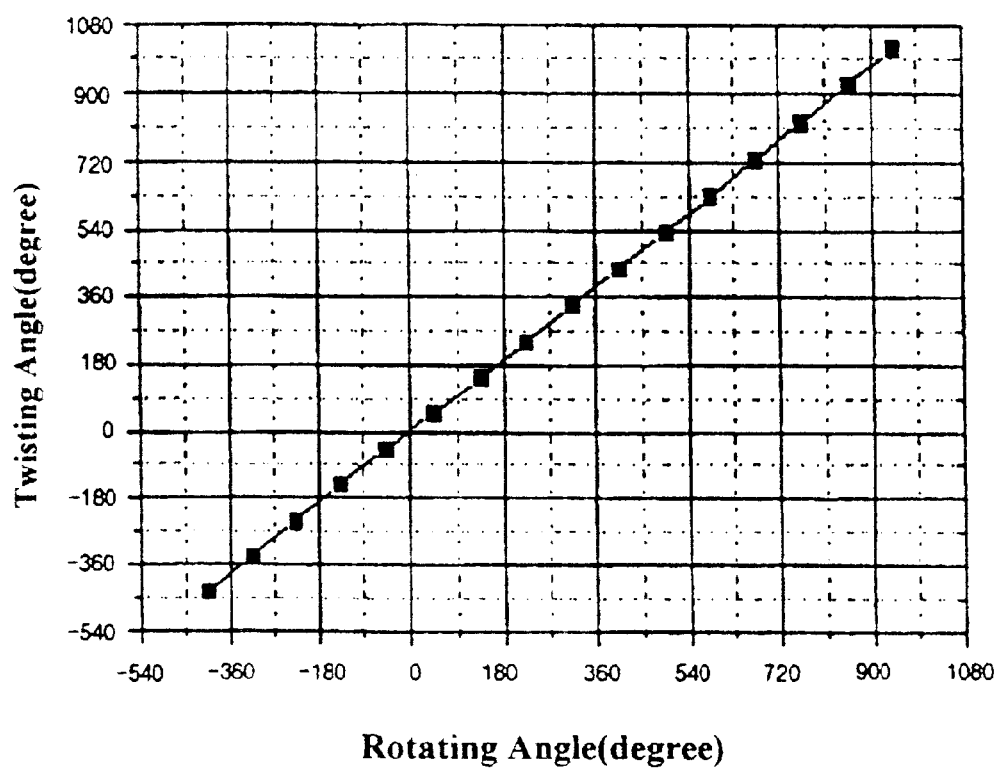
FIG. 9 is a graph showing the angle between the birefringence modulators needed for operating the polarization scrambler regardless of the input SOP.

FIG. 9 shows analyzed result of this condition, where the angle between the birefringence modulators (the angle between 22 and 24 of FIG. 8) necessary for the operation of the polarization scrambler regardless of the polarization state of input light is measured. The result can be expressed as a linear function of the following equation (5).

$$Y=X+0.08X=1.08X \tag{5}$$

where, X is 45±90n which is the preferred angle in general. But Y is an actual angle between the two neighboring birefringence modulators, that is, twist angle of the optical fiber which can be any value among ±49, ±146, ±243, ±340 . . . Especially, the angle of ±340 degrees can enable a polarization scrambler of an overall compact size since the height of the two birefringence modulators under the twisted state is reduced.

Also, the angle between the neighboring birefringence modulators can be configured arbitrary by placing an additional polarization controller between the two neighboring birefringence modulators. Preferably, the all-fiber polarization controller disclosed in Korean patent application No.97-20056 can be used as the polarization controller.

As described above, the optical fiber polarization scrambler of the present invention utilizes the resonance frequency of the thickness mode of the cylindrical piezo device to efficiently induce birefringence modulation and to be stable against temperature change.

The present invention provides an optical fiber polarization scrambler with a structure which can compensate the effect of circular birefringence caused by twisting the optical fiber between the neighboring birefringence modulators consisting the optical fiber polarization scrambler, and an operating parameter input method for efficiently operating the same.

What is claimed is:

1. An optical fiber polarization scrambler having optical fiber birefringence modulators and alternating voltage sources, said optical fiber birefringence modulators including at least two hollow cylindrical piezo devices and a strand of optical fiber wound around outer walls of the piezo devices, said alternating voltage sources respectively applying alternating voltage to each optical fiber birefringence modulator to induce polarization modulation, wherein the optical fiber wound around the piezo devices is not twisted in axial direction of the optical fiber to prevent inducing of circular birefringence thereat, said optical fiber polarization scrambler comprising means for compensating effect of circular birefringence caused by twist between the neighboring birefringence modulators in order to input the input light with its polarization plane forming an angle of 45±90n degrees with respect to the direction of a principal axis of a back birefringence modulator when the polarization plane of the input light is parallel to the principal axis of the front birefringence modulator, where n is an integer.

2. The optical fiber polarization scrambler of claim 1, wherein the hollow cylindrical piezo devices have different wall thickness to make the resonance frequency of the thickness mode of each piezo device of the optical fiber birefringence modulators different.

3. The optical fiber polarization scrambler of claim 1, wherein an optical fiber constituting the optical fiber birefringence modulators don't have any splicing point between the two optical fiber birefringence modulators.

4. The optical fiber polarization scrambler of claim 1, wherein the means for compensating effect of circular birefringence applies further twist to the neighboring birefringence modulator at an angle corresponding to 8% of the angles of 45±90n degrees, where n is an integer.

5. The optical fiber polarization scrambler of claim 1, wherein the optical fiber is a single mode optical fiber whose intrinsic linear birefringence is less than $5 \times 10^{-6}$.

6. The optical fiber polarization scrambler of any one of claims 1–5, wherein the linear birefringence induced by tension-winding the optical fiber caused by radius of curvature of the outer wall of the piezo device is maintained 30 times or more than the intrinsic birefringence of the optical fiber, and the wound optical fiber being heat-treated to quench spurious birefringence.

7. The optical fiber polarization scrambler of claim 1, wherein the cross-section of the optical fiber is in a shape of D, and the optical fiber is wound with the flat plane of the optical fiber abutting the outer walls of the piezo devices in order to prevent twist of the optical fiber in the axial direction.

8. The optical fiber polarization scrambler of claim 1, further comprising:

means for measuring temperature of the birefringence modulator; and means for determining modulation amplitude corresponding to the temperature sensed by the means for measuring the temperature.

9. The optical fiber polarization scrambler of claim 1, further comprising means for maintaining temperature of the birefringence modulator constant.

10. An optical fiber polarization scrambler comprising:

optical fiber birefringence modulators including at least two hollow cylindrical piezo devices and an optical fiber wound around outer walls of the hollow cylindrical devices; and alternating voltage sources applying alternating voltages to each optical fiber birefringence modulator to induce polarization modulation, wherein the polarization controller is inserted between the neighboring birefringence modulators, and wherein the hollow cylindrical piezo devices have different wall thickness to make the resonance frequency of the thickness mode of each piezo device of the optical fiber birefringence modulators different.

11. An optical fiber polarization scrambler comprising:

optical fiber birefringence modulators including at least two hollow cylindrical piezo devices and an optical fiber wound around outer walls of the hollow cylindrical devices; and alternating voltage sources applying alternating voltages to each optical fiber birefringence modulator to induce polarization modulation, wherein the polarization controller is inserted between the neighboring birefringence modulators, and means for maintaining temperature of the birefringence modulator; and means for determining modulation amplitude corresponding to the temperature sensed by the means for measuring the temperature.

12. An optical fiber polarization scrambler comprising:

optical fiber birefringence modulators including at least two hollow cylindrical piezo devices and an optical fiber wound around outer walls of the hollow cylindrical devices; and alternating voltage sources applying alternating voltages to each optical fiber birefringence modulator to induce polarization modulation, wherein the polarization controller is inserted between the neighboring birefringence modulators, and means for maintaining temperature of the birefringence modulator constant.

13. An operating parameter input method for an optical fiber polarization scrambler comprising:

optical fiber birefringence modulators including at least two hollow cylindrical piezo devices and a continuous optical fiber wound around each outer walls of the piezo devices; and alternating voltage sources for applying alternating voltage to each optical fiber birefringence modulator to induce polarization modulation;

wherein said alternating voltage applied to each birefringence modulator is a sinusoidal waveform with different frequencies, and amplitude of the alternating voltage being configured as a value minimizing degree of polarization measured from output light signal sensed from an optical sensor after light from the light source passing in turn an input polarization controller, the optical fiber polarization scrambler, an output polarization controller and a polarizer.

14. The operating parameter input method of claim 13, wherein thickness mode resonance frequency of the piezo device is used as the birefringence modulation frequency.

15. The operating parameter input method of claim 13, wherein the birefringence modulation amplitude of each optical fiber birefringence modulator is selected from solutions of the zeroth-order Bessel function to operate the optical fiber polarization scrambler.

16. An optical fiber polarization modulator having an optical fiber birefringence modulator and an alternating voltage source, said optical fiber birefringence modulator including a hollow cylindrical piezo device and a continuous optical fiber wound around outer wall of the piezo device, said alternating voltage source applying alternating voltage to the optical fiber birefringence modulator to induce birefringence modulation, wherein the frequency of the alternating voltage is adjusted to the proximity of the resonance frequency for thickness mode of the piezo device.

* * * * *

UNITED STATES PATENT AND TRADEMARK OFFICE
CERTIFICATE OF CORRECTION

PATENT NO. : 6,266,456 B1
DATED : July 24, 2001
INVENTOR(S) : Lee et al.

It is certified that error appears in the above-identified patent and that said Letters Patent is hereby corrected as shown below:

Column 5,
Line 52, "and [ ] the" should read -- and the --

Column 7,
Line 60, "of IcHz because" should read -- of kHz because --

Column 8,
Line 5, "axial-direction" should read -- axial direction --
Line 8, "wound ( on" should read -- wound on --

Column 10,
Line 12, "for maintaining temperature" should read -- for measuring temperature --

Signed and Sealed this

Ninth Day of July, 2002

Attest:

JAMES E. ROGAN
Attesting Officer   Director of the United States Patent and Trademark Office